United States Patent [19]

Newbould et al.

[11] Patent Number: 4,911,742

[45] Date of Patent: * Mar. 27, 1990

[54] METHOD OF MANUFACTURING OPTICAL FIBERS

[75] Inventors: Richard T. Newbould, Harlow, United Kingdom; Susan J. Piggs, Bishops Stortford, England; Stephen J. Wilson, Duxford, United Kingdom

[73] Assignee: STC, plc, London, England

[*] Notice: The portion of the term of this patent subsequent to Aug. 26, 2003 has been disclaimed.

[21] Appl. No.: 314,325

[22] Filed: Feb. 23, 1989

Related U.S. Application Data

[63] Continuation of Ser. No. 23,984, Mar. 11, 1987, abandoned, which is a continuation of Ser. No. 776,682, Sep. 16, 1985, abandoned.

[30] Foreign Application Priority Data

Sep. 29, 1984 [GB] United Kingdom ................ 8424641

[51] Int. Cl.$^4$ .............................................. C03C 25/02
[52] U.S. Cl. ........................................ 65/3.12; 65/18.2; 65/18.3; 65/30.1; 65/900; 65/3.2; 65/3.11; 427/163
[58] Field of Search ................ 65/2, 3.11, 3.12, 18.2, 65/18.3, 30.1, 900, 3.2; 427/163, 167

[56] References Cited

U.S. PATENT DOCUMENTS

| | | | |
|---|---|---|---|
| 4,030,901 | 6/1977 | Kaiser | 65/157 |
| 4,118,211 | 10/1978 | Au Coin et al. | 65/3 R |
| 4,203,744 | 5/1980 | Schultz et al. | 65/3.11 |
| 4,227,907 | 10/1980 | Merritt | 65/3.11 |
| 4,286,978 | 9/1981 | Bailey et al. | 65/3.12 |
| 4,367,013 | 1/1983 | Guerder et al. | 65/3.12 |
| 4,388,094 | 6/1983 | Carpenter et al. | 65/3.12 |
| 4,402,720 | 9/1983 | Edahiro et al. | 65/3.12 |
| 4,417,910 | 1/1983 | Passaret | 65/18.4 |
| 4,445,754 | 5/1984 | Beales et al. | 65/3.11 |
| 4,501,602 | 2/1985 | Miller et al. | 65/18.3 |
| 4,574,063 | 3/1986 | Scherer | 65/21.4 |
| 4,608,276 | 8/1986 | Lamb et al. | 65/3.11 |

FOREIGN PATENT DOCUMENTS 2062615 5/1981 United Kingdom .
1592234 7/1981 United Kingdom .

OTHER PUBLICATIONS

Hackh's Chemical Dictionary, McGraww-Hill, N.Y., N.Y., Fourth Ed. 1969, p. 457.

Primary Examiner—Kenneth M. Schor
Assistant Examiner—Lori Ann Johnson
Attorney, Agent, or Firm—Kerkam, Stowell, Kondracki & Clarke

[57] ABSTRACT

In order to eliminate the effect of water attack on silica optical fibres, the fibres are provided with a surface layer of silicon nitride or silicon oxynitride. The method proposed comprises direct nitridation. This may be achieved by adding a nitriding atmosphere to the drawing furnace gases, or to the reactive gases ($TiCl_4$ and $SiCl_4$) incorporated in the flame of an oxyhydrogen torch for the formation of a compressive silica/titania layer on an optical fibre by a glass soot deposition and sintering process.

8 Claims, 1 Drawing Sheet

METHOD OF MANUFACTURING OPTICAL FIBERS

This is a continuation of application Ser. No. 023,984, filed Mar. 11, 1987 now abandoned which is a continuation of application Ser. No. 776,682 filed Sept. 16, 1985 now abandoned.

BACKGROUND OF THE INVENTION

This invention relates to optical fibres and, in particular, to the manufacture of optical fibres.

Optical fibres with a thin surface layer of silicon nitride or silicon oxynitride are known to show significant improvements in static fatigue performance as stress corrosion due to water attack is retarded. More recently, such surface layers have been found to be very effective barriers to the diffusion of free hydrogen into optical fibres. The thickness of the coating required is of the order of 200Å. The methods of production of such known silicon nitride or silicon oxynitride layers on optical fibres involve chemical vapour base (CVD) techniques.

SUMMARY OF THE INVENTION

According to one aspect of the present invention there is provided a method of manufacturing silica optical fibre including the step of directly nitriding the surface of silica preform or fibre.

According to another aspect of the present invention there is provided a method of providing a silica optical fibre with silicon nitride or silicon-oxynitride layer thereon including the step of direct nitridation of the surface of the fibre or a preform from which the fibre is to be drawn.

According to another aspect of the present invention there is provided a method of manufacturing silica optical fibre comprising the steps of taking a consolidated silica preform from which the silica optical fibre is to be drawn, the consolidated silica preform having a surface layer containing oxygen; chemically changing the surface layer by substituting at least part of the oxygen therein with nitrogen; and heating the preform with the changed surface layer to a fibre-drawing temperature and drawing optical fibre therefrom.

BRIEF DESCRIPTION OF THE DRAWINGS

Embodiments of the present invention will now be described with reference to the accompanying drawings, in which.

DESCRIPTION OF THE PREFERRED EMBODIMENTS

The basic method proposed by the present invention, involves direct nitridation of the silicate surface of an optical fibre preform (or a fibre) to a silicon oxynitride based surface, rather than the CVD techniques referred to above. The glass is converted in the presence of a reducing nd nitriding atmosphere at high temperature ($\sim 900°$ C). Direct nitridation, in order to produce a surface layer of silicon oxynitride on nitride on the surface of silica, is a surface modification technique. That is the existing silica surface is chemically changed, as opposed to CVD methods which deposit further material onto a surface.

Figure 1:
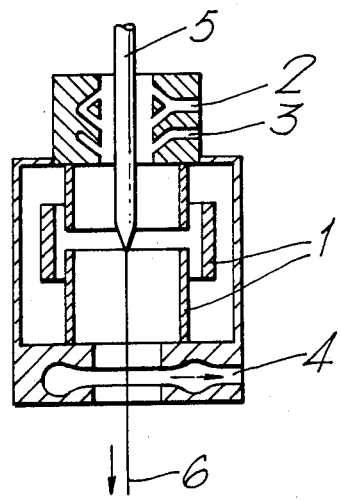
FIG. 1 shows schematically a furnace arrangement for the direct nitridation of the surface of optical fibres.

FIG. 1 illustrates schematically a furnace arrangement for the direct nitridation of optical fibre surfaces. The furnace illustrated is of the carbon resistance type with carbon hearths and element 1 and has a top gas injection means including a port 2 for the introduction of a furnace purge gas and a port 3 for the introduction of a chosen recipe of reactive gases (nitriding atmosphere) into the furnace atmosphere. All gases exiting the furnace are extracted using a radial port 4. A silica based optical fibre preform 5 is, in use of the furnace, drawn into fibre 6 in the conventional manner. Typically the reactive gas may comprise ammonia. The silica based fibre 6 drawn using the furnace has its surface impregnated with nitrogen. That is, the glass surface has amounts of oxygen substituted by nitrogen in the form of oxynitrides.

Compressive claddings comprising titania doped silica have previously been applied to silica fibres in order to yield fibres with elevated tensile strength, static fatigue due to water attack is not overcome thereby. Such titania doped silica claddings may be applied to silica glass preforms, which are subsequently drawn down to fibres. When $SiCl_4$ and $TiCl_4$ are heated in an oxy/hydrogen flame, a $SiO_2/TiO_2$ soot results. The size and $SiO_2:TiO_2$ ratio of the soot can be controlled by controlling the various gas flow-rates passing through the oxy/hydrogen torch.

Figure 2:
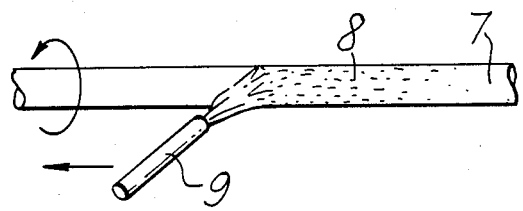
FIG. 2 shows schematically the production of a preform for optical fibres with a surface layer of silicon oxynitride under compressive loading.

A glass preform 7 (FIG. 2) can be coated with the $SiO_2/TiO_2$ soot 8 by rotating it across the flame of the oxy/hydrogen torch 9 and traversing the torch along the length of the preform. The fragile soot adheres loosely to the glass preform when first deposited and may be immediately sintered into compact glass under the action of a heat source, which may be the deposition torch itself. Alternatively, the soot can be sintered during drawing into fibre in the drawing furnace.

$TiO_2$ in solution with $SiO_2$ in low concentrations ($TiO_2$ 10% wt) is a low, or negative, expansion glass. When, for example, a 125 $\mu$m silica glass fibre has a thin ($\sim 5$ $\mu$m) layer of this glass over its surface, the "silica bulk" of the fibre draws the $Ti_2/SiO_2$ surface into compression yielding, as mentioned above, a fibre with elevated tensile strength but still subject to water attack. The water attack problem can be eliminated by producing a very thin layer ($\sim 200$Å) of silicon oxynitride or silicon nitride over the glass fibre.

Ammonia is able to substitute nitrogen for oxygen in $SiO_2$ or $TiO_2$. Therefore in one way of obtaining the silicon oxynitride or nitride layer it is proposed that during the deposition process the torch also injects $NH_3$ into the vapour stream to yield a soot of silica/titania oxynitride/nitride. The soot is applied to a preform and processed in a similar manner to that described above, resulting in an optical fibre with high strength and high retention of strength. The titania/silica glass contains nitrogen at the molecular level.

Typically the gas flows to the oxyhydrogen torch may be as follows: $TiCl_4$ 198 cc min$^{-1}$; $SiCl_4$ 185 cc min$^{-1}$; $H_2$ 4 to 20 liters min$^{-1}$, $O_2$ 2 to 10 liters min$^{-1}$ (the actual $O_2$ and $H_2$ values depend on the level of sinter required); and $NH_3$ 200 cc min$^{-1}$. Without the ammonia the glass obtained is $SiO_2/\sim 3\%$ $TiO_2$. The torch is specially designed in order to burn a predetermined ratio of titanium and silicon tetrachloride vapours in an oxy/hydrogen flame to produce the aforementioned soot. The torch provides the reactants and heat for the reactions:

The torch also burns to produce heat which sinters the $TiO_2/SiO_2$ soot onto the surface of the silica preform.

Alternatively, the silicon oxynitride or nitride layer may be produced after the $SiO_2/TiO_2$ soot as a separate process, in which case the soot applied to the preform may be only partially sintered prior to direct nitridation and drawing in a furnace as described above with respect to FIG. 1, for example. In both cases, the ratio of silicon coating thickness must be carefully chosen to effect the maximum compressive stress in the surface of the optical fibre. A compressive stress can result in the surface of an optical fibre (silica based) because silica containing traces of titania can exhibit significantly lower thermal expansion coefficients than silica glass. The glass containing titania can also exhibit a slightly high glass transition temperature. Therefore, as an optical fibre is drawn from its preform and freezes in, the bulk of the fibre will contract and compress the low contraction surface.

We claim:

1. A method of manufacturing silica optical fibers comprising the steps of taking a consolidated silica preform from which the optical fiber is to be drawn, the consolidated silica preform having a radially outermost surface layer containing oxygen; subjecting the preform to an atmosphere of ammonia at a temperature on the order of 900° C. to chemically change the surface layer by substituting at least part of the oxygen therein with nitrogen provided by said ammonia so as to form a silicon oxynitride or a silicon nitride layer in dependence on the amount of oxygen substituted with nitrogen; and heating the preform with the changed surface layer to a fiber drawing temperature and drawing optical fiber therefrom, which optical fibre has a silicon oxynitride or silicon nitride layer at its radially outermost surface that protects the fiber at least partially from water attack.

2. A method as claimed in claim 1 including, prior to said step of subjecting the preform to the ammonia atmosphere, the step of applying a compressive surface layer to the radially outermost surface layer of the preform, and wherein a radially outermost part of the compressive surface layer comprises the radially outermost surface layer containing oxygen which is to be chemically changed, the manufactured fiber thus being provided with a corresponding compressive layer under the silicon oxynitride or silicon nitride layer.

3. A method of manufacturing silica optical fibers comprising the steps of taking a consolidated silica preform from which the silicon optical fibre is to be drawn, the silica preform having a radially outermost surface layer containing oxygen, heating the preform to a fiber drawing temperature in a drawing furnace while an atmosphere of ammonia is injected into the drawing furnace and drawing and optical fiber from the heated preform, the ammonia atmosphere within the drawing furnace serving to chemically change a radially outermost part of the radially outermost oxygen containing surface layer of the preform and the corresponding radially outermost surface of the optical fiber being drawn from the preform by substituting at least part of the oxygen therein with nitrogen provided by said ammonia to form a silicon oxynitride or a silicon nitride layer in dependence on the amount of oxygen substituted with nitrogen at said radially outermost surface of the fiber so that the manufactured fiber is at least partially protected from water attack.

4. A method as claimed in claim 3 including the step, prior to said heating step, of applying a compressive surface layer to the radially outermost surface layer of said consolidated preform, and wherein a radially outermost part of the compressive surface layer comprises said radially outermost part of the radially outermost surface layer of the preform which is to be chemically changed, the manufactured fiber thus being provided with a corresponding compressive layer under the silicon oxynitride or silicon nitride layer.

5. A method as claimed in claim 4 wherein the application of the compressive surface layer comprises incorporating $TiCl_4$ and $SiCl_4$ in the flame of an oxyhydrogen torch so as to form a titania/silica soot, depositing the soot on the radially outermost surface of the preform and sintering the soot, and wherein the fiber is drawn from the preform in the drawing furnace while the ammonia atmosphere is injected into the drawing furnace, the ammonia atmosphere within the furnace chemically changing the radially outermost part of the compressive surface layer of the preform and the corresponding surface layer of the optical fiber being drawn from the preform, which radially outermost part of the compressive surface layer comprises said radially outermost surface layer containing oxygen, by substituting at least part of the oxygen therein with nitrogen.

6. A method of manufacturing silica optical fibers comprising the steps of taking a consolidated silica preform from which the silica optical fiber is to be drawn; applying a compressive surface layer containing oxygen to a radially outermost surface of the preform by incorporating $TiCl_4$ and $SiCl_4$ in the flame of an oxyhydrogen torch so as to form a titania/silica soot, depositing the soot on the radially outermost surface of the preform and sintering the soot; and heating the preform to a fiber-drawing temperature in a drawing furnace while an ammonia atmosphere is injected into the drawing furnace, and drawing an optical fiber from the heated preform, the ammonia temperature within the drawing furnace serving to chemically change a radially outermost part of the compressive surface layer of the preform, and the corresponding surface layer of the optical fiber being drawn from the preform, by substituting at least part of the oxygen therein with nitrogen provided by said ammonia to form a silicon oxynitride or silicon nitride layer in dependence on the amount of oxygen substituted with nitrogen at the radially outermost surface of the fibre so that the manufactured fiber is protected at least partially from water attack.

7. A method of manufacturing silica optical fibers protected at least partially from water attack comprising the steps of taking in consolidated silica preform which is unprotected from water attack and has a radially outermost surface layer containing oxygen and drawing a silica optical fiber from the preform while an ammonia atmosphere is present in the drawing furnace so that a radially outermost part of the surface layer of the preform, and the corresponding surface layer of the optical fiber being drawn from the preform, is converted, due to the presence of the ammonia atmosphere in the furnace, to a silicon oxynitride surface by substituting at least part of the oxygen therein with nitrogen provided by ammonia, the drawn silicon fiber being protected at least partially from water attack by said corresponding converted surface layer of the optical fiber.

8. A method of manufacturing silica optical fibers protected at least partially from water attack comprising the steps of taking a consolidated silica preform which is unprotected from water attack and has a radially outermost surface layer containing oxygen and drawing a silica fiber from the preform while an ammonia atmosphere is present in the drawing furnace so that a radially outermost part of the surface layer of the preform, and the corresponding surface layer of the optical fiber being drawing from the preform, is converted, due to the presence of the ammonia atmosphere in the furnace, to a silicon nitride surface by substituting at least part of the oxygen therein with nitrogen provided by said ammonia, the drawn silica fiber being protected at least partially from water attack by said corresponding converted surface layer of the optical fiber.

* * * * *